(12) United States Patent
Hanawa et al.

(10) Patent No.: US 7,759,899 B2
(45) Date of Patent: Jul. 20, 2010

(54) BATTERY PACK, AND ASSEMBLY OF BATTERY PACK AND MOTOR-DRIVEN TOOL OR CHARGER

(75) Inventors: Hiroyuki Hanawa, Hitachinaka (JP); Atsushi Nakagawa, Hitachinaka (JP); Keita Saito, Hitachinaka (JP)

(73) Assignee: Hitachi Koki Co., Ltd., Tokyo (JP)

( * ) Notice: Subject to any disclaimer, the term of this patent is extended or adjusted under 35 U.S.C. 154(b) by 481 days.

(21) Appl. No.: 11/850,906

(22) Filed: Sep. 6, 2007

(65) Prior Publication Data
US 2008/0061738 A1    Mar. 13, 2008

(30) Foreign Application Priority Data
Sep. 7, 2006    (JP) .......................... P2006-243386

(51) Int. Cl.
*H01M 10/46* (2006.01)
(52) U.S. Cl. ..................................... 320/114
(58) Field of Classification Search ................ 320/107, 320/110, 111, 114, 116; 439/313, 314
See application file for complete search history.

(56) References Cited

U.S. PATENT DOCUMENTS 5,248,927 A * 9/1993 Takei et al. ................ 320/113
6,350,149 B1 2/2002 Nakane
2001/0017531 A1* 8/2001 Sakakibara et al. ......... 320/106
2005/0162128 A1 7/2005 Ebine

FOREIGN PATENT DOCUMENTS

| DE | 20023631 | 5/2005 |
|----|----------|--------|
| EP | 0694980  | 1/1996 |
| EP | 1158619  | 11/2001 |
| GB | 2280995  | 2/1995 |
| JP | 855617   | 2/1996 |

OTHER PUBLICATIONS

Japanese Office Action mailed Apr. 7, 2009.

* cited by examiner

*Primary Examiner*—Edward Tso
(74) *Attorney, Agent, or Firm*—McDermott Will & Emery LLP

(57) ABSTRACT

A battery pack has a housing, a battery cell containing part which is provided in the housing and contains battery cells, a plurality of first terminals which are electrically connected to the battery cell containing part, a plurality of second terminals through which control signals for controlling at least one of charge and discharge of the battery cells contained in the battery cell containing part are transmitted. The first and second terminals can be pressure fitted to corresponding terminals of the body of the apparatus. The first and second terminals are so constructed that when the housing has been attached to the body of the apparatus, fitting pressure exerted on the first terminals is higher than fitting pressure exerted on the second terminals.

17 Claims, 8 Drawing Sheets

BATTERY PACK, AND ASSEMBLY OF BATTERY PACK AND MOTOR-DRIVEN TOOL OR CHARGER

CROSS-REFERENCE TO RELATED APPLICATIONS

This application is based on and claims the benefit of priority from the prior Japanese Patent Application No. 2006-243386, filed on Sep. 7, 2006; the entire contents of which are incorporated herein by reference.

BACKGROUND

1. Technical Field

The present invention relates to a battery pack which can be charged by a charger and can supply power to a motor-driven tool, and an assembly of the battery pack and the charger or the motor-driven tool.

2. Description of the Related Art

The battery pack has been widely used as a power source of a motor-driven tool, and battery cells contained in the battery pack have been repeatedly charged and discharged. Usually, the battery pack includes, as terminals to be electrically connected to an exterior apparatus such as the motor-driven tool and the charger, a power terminal through which electric current for charging or discharging the battery cells flows, and a signal transmitting terminal which transmits control signals for controlling the charge and discharge of the battery cells to the exterior apparatus. Conventionally, all the above described terminals including the power terminal and the signal transmitting terminal have had the same shape in a form of pin, braid, braid receiver, etc. which are formed of electrically conductive metal, and their uses have been determined according to parts of the exterior apparatus to which the terminals are connected.

SUMMARY

However, the battery pack is frequently attached to and detached from the motor-driven tool or the charger at every time when the battery cells contained therein are charged and discharged repeatedly, and so, the terminals may be sometimes worn out or deformed. Particularly, when the power terminal has been worn out or deformed, defective contact with the terminal of the motor-driven tool or the charger may occur. As the results, contact resistance in an electrical contact part between the motor-driven tool and the battery pack will be increased, and a large current may often flow through the power terminal, which will lead to generation of heat in the power terminal. In case where the power terminal has blown out with this heat, the power supply from the battery pack to the motor-driven tool may be sometimes hindered. This has incurred a short life of the battery pack itself.

In view of the above described problem, it is an object of the invention to provide a battery pack in which generation of heat in terminals can be restrained, an assembly of the battery pack and a motor-driven tool, and an assembly of the battery pack and a charger.

According to the invention, there is provided a battery pack which is detachably attached to an apparatus provided with a plurality of terminals, and adapted to supply power to the apparatus, the battery pack comprising a housing, a battery cell containing part which is provided in the housing and contains battery cells, a plurality of first terminals which are electrically connected to the battery cell containing part, a plurality of second terminals through which control signals for controlling at least one of charge and discharge of the battery cells contained in the battery cell containing part are transmitted, characterized in that the first terminals and the second terminals can be pressure fitted to corresponding terminals of the body of the apparatus, and that the terminals of the apparatus are so constructed that when the housing has been attached to the body of the apparatus, fitting pressure exerted on the first terminals is higher than fitting pressure exerted on the second terminals.

In the above described structure, when the battery cells have been contained in the battery cell containing part and the housing has been attached to the apparatus, the first terminals will be pressure fitted to the corresponding terminals of the apparatus enabling the power to be supplied from the battery pack to the body of the apparatus. When the apparatus has started to be driven, electric current will flow from the battery cells to the body of the apparatus through the first terminals, whereby the power will be supplied to the body of the apparatus. Moreover, in case where the second terminals are pressure fitted to the corresponding terminals of the body of the apparatus, control signals for controlling discharge of the battery cells will be transmitted between the body of the apparatus and the battery pack through signal transmitting terminals.

In the battery pack, while the housing is attached to the body of the apparatus, fitting pressure exerted on the first terminals is higher than fitting pressure exerted on the second terminals. Accordingly, due to the high fitting pressure exerted on the first terminals, defective contact between the first terminals and the power supply terminals of the body of the apparatus can be restrained, and hence, generation of heat in the first terminals caused by the current flowing to the body of the apparatus can be restrained. Specifically, because the first terminals can obtain wide contact areas with respect to the terminals of the body of the apparatus, an increase of the contact resistance can be restrained, and therefore, generation of heat in the first terminals when a large amount of current flows due to defective contact can be restrained. Moreover, generation of arc between the first terminals and the terminals of the body of the apparatus due to the defective contact will be restrained, and thus, damage or blowout of these terminals can be prevented.

On the other hand, almost no electric current flows through the second terminals, because the control signal has very small current component. Therefore, even in case where the contact resistance of the second terminals has increased due to a small contact area with the terminals of the body of the apparatus, generation of heat scarcely occurs in the second terminals, because amount of the current is small. This is the reason why such high fitting pressure as in the first terminals is not required in the second terminals.

In addition, because the fitting pressure of the first terminals only is high as compared with the fitting pressure of the second terminals, the battery pack can be easily attached and detached to and from the body of the apparatus, and hence, operability will be improved.

Preferably, the terminals of the apparatus have such a shape that a flat plate in a substantially rectangular shape formed of electrically conductive material is bent into a U-shape, and is so shaped as to be pressure contacted with each of the terminals of the body of the apparatus, when the terminal is engaged with the first or second terminal by inserting it into an open end of the U-shape along an inserting direction from the open end of the U-shape toward a bottom of the U-shape. In this case, the flat plate of the first terminal has a larger thickness than the flat plate of the second terminal. Alternatively, arm portions of the U-shape of the first terminal may have a shorter length than arm portions of the U-shape of the second terminal.

According to the above described structure, mechanical strength of the first terminal becomes high as compared with the second terminal. As the results, when the corresponding terminal of the body of the apparatus has been pressure fitted into the open end of the U-shaped first or second terminal along the inserting direction from the open end toward the bottom, the first terminal will be less deformed than the second terminal. In this manner, the fitting pressure exerted on the first terminal can be made higher than the fitting pressure exerted on the second terminal.

Preferably, the terminals of the apparatus are formed of a flat plate in a substantially rectangular shape formed of electrically conductive material which extends in an direction of inserting the housing into the body of the apparatus, and the flat plate of the first terminal has a larger thickness than the flat plate of the second terminal. According to this structure, when the first terminal is pressure fitted to the corresponding terminal of the body of the apparatus, the first terminal can be fitted with the higher fitting pressure as compared with a case where the second terminal is pressure fitted to the corresponding terminal of the apparatus.

Moreover, the first and second terminals are preferably provided in the housing in a row along a first length extending in a direction perpendicular to the inserting direction, and a plurality of the first terminals are separated to be arranged at both sides of a centerline which intersects a middle of the first length. According to this structure, the first terminals which require a larger force, when the battery pack is attached to the body of the apparatus, are separated to be arranged at both sides of the centerline, and hence, the force required for pressure fitting the first and second terminals to the corresponding terminals of the body of the apparatus can be uniformly dispersed along the first length. As the results, the battery pack can be smoothly attached to the body of the apparatus.

Moreover, the apparatus is preferably a motor-driven tool. Usually, the motor-driven tool moves with vibration. Even though this vibration acts on amounting area between the battery pack and the motor-driven tool, the pressure fitting part between the first terminal and the corresponding terminal of the tool will bear the vibration, because the fitting pressure in the pressure fitting part is high. In this manner, defective contact between the first terminal and the terminal of the motor-driven tool can be restrained. As the results, an increase of the contact resistance in the fitting part between the first terminal and the terminal of the motor-driven tool will be restrained, and hence, generation of heat in the first terminal when the power is supplied to the tool can be restrained. On the other hand, the fitting pressure of the second terminal with respect to the motor-driven tool is small, and hence, the battery pack can be smoothly attached and detached to and from the motor-driven tool.

Further, the first and second terminals are preferably so constructed that when the housing is mounted on a charger having a plurality of terminals, the first and second terminals are pressure fitted to corresponding terminals of the charger, and that fitting pressure exerted on the first terminals is higher than fitting pressure exerted on the second terminal.

In the above described structure, when the battery pack having the battery cells contained in the battery cell containing part has been attached to the charger, the first terminals will be pressure fitted to the corresponding terminals of the charger, whereby the battery cells will be charged by the charger. At the same time, the second terminals will be pressure fitted to the control terminals of the charger, as the corresponding terminals of the charger, whereby the control signals for controlling charge of the battery cells will be transmitted between the charger and the battery pack through the second terminals.

While the battery pack is charged by the charger, the fitting pressure exerted on the first terminals is higher than the fitting pressure exerted on the second terminals. Therefore, the high fitting pressure will restrain defective contact between the first terminals and the terminals of the charger, and generation of heat in the first terminals due to the current which flows from the charger to the battery pack can be restrained. In addition, because the fitting pressure of the first terminals only is high as compared with the fitting pressure of the second terminals, the battery pack can be easily attached and detached to and from the charger, and hence, operability will be improved.

According to the invention, there is further provided an assembly of a battery pack and a motor-driven tool to which power can be supplied from the battery pack, the battery pack comprising a housing, a battery cell containing part which is provided in the housing and contains battery cells, a plurality of first terminals which are electrically connected to the battery cell containing part, a plurality of second terminals through which control signals for controlling discharge of the battery cells are transmitted, the motor-driven tool comprising a motor, a mounting part on which the battery pack can be detachably mounted, power supply terminals which are provided on the mounting part in electrical connection with the motor, and can be respectively engaged with the first terminals, and signal terminals which are provided on the mounting part, and can be engaged with the second terminals, characterized in that the first and second terminals, the power supply terminals, and the signal terminals are so constructed that fitting pressure at a time when the first terminals are engaged with the power supply terminals is higher than fitting pressure at a time when the second terminals are engaged with the signal terminals.

According to the above described structure, even though the vibration generated with motion of the motor-driven tool acts on a mounting area between the battery pack and the tool, the pressure fitting part between the first terminal and the corresponding terminal of the tool will bear the vibration, because the fitting pressure in the pressure fitting part is high. In this manner, defective contact between the first terminal and the terminal of the motor-driven tool can be restrained. As the results, an increase of the contact resistance in the fitting part between the first terminal and the terminal of the motor-driven tool will be restrained, and hence, generation of heat in the first terminal when the power is supplied to the tool can be restrained. On the other hand, the fitting pressure of the second terminal with respect to the motor-driven tool is small, and hence, the battery pack can be smoothly attached and detached to and from the motor-driven tool.

Further, according to the invention, there is provided an assembly of a battery pack and a charger which can charge the battery pack, the battery pack comprising a housing, a battery cell containing part which is provided in the housing and contains battery cells, a plurality of first terminals which are electrically connected to the battery cell containing part, a plurality of second terminals through which control signals for controlling charge of the battery cells are transmitted, the charger comprising a mounting part on which the battery pack can be detachably mounted, power supply terminals provided on the mounting part so as to be connected to a power source, and adapted to be respectively engaged with the first terminals, and signal terminals provided on the mounting part and adapted to be engaged with the second terminals, characterized in that the first and second terminals, the power supply terminals, and the signal terminals are so constructed that fitting pressure at a time when the first terminals are engaged with the power supply terminals is higher than fitting pressure at a time when the second terminals are engaged with the signal terminals.

While the battery pack is charged by the charger, the fitting pressure exerted between the first terminals and the power supply terminals is higher than the fitting pressure exerted between the second terminals and the signal terminals. Therefore, defective contact between the first terminals and the power supply terminals can be restrained, and generation of heat in the first terminals due to the current which flows from the charger to the battery pack can be restrained. In addition, because the fitting pressure of the first terminals only is high as compared with the fitting pressure of the second terminals, the battery pack can be easily attached and detached to and from the charger, and hence, operability will be improved.

ADVANTAGE OF THE INVENTION

According to the invention, it is possible to restrain defective contact between the first terminals of the battery pack and the terminals of the body of the apparatus such as the motor-driven tool or charger, and to prevent an increase of contact resistance between the first terminals of the battery pack and the terminals of the body of the apparatus. As the results, generation of heat in the first terminals when a large amount of electric current flows between the battery pack and the body of the apparatus through the first terminals can be restrained. Therefore, it is possible to prevent damage or blowout of the first terminals. Further, it is possible to easily attach the battery pack to the body of the apparatus.

DESCRIPTION OF THE EMBODIMENTS

Now, embodiments according to the invention will be described referring to the attached drawings. It is to be noted that the vertical (upper and lower), lateral (left and right) and longitudinal directions (forward and backward) in the following description are equal to the directions as defined in the attached drawings.

Figure 1:
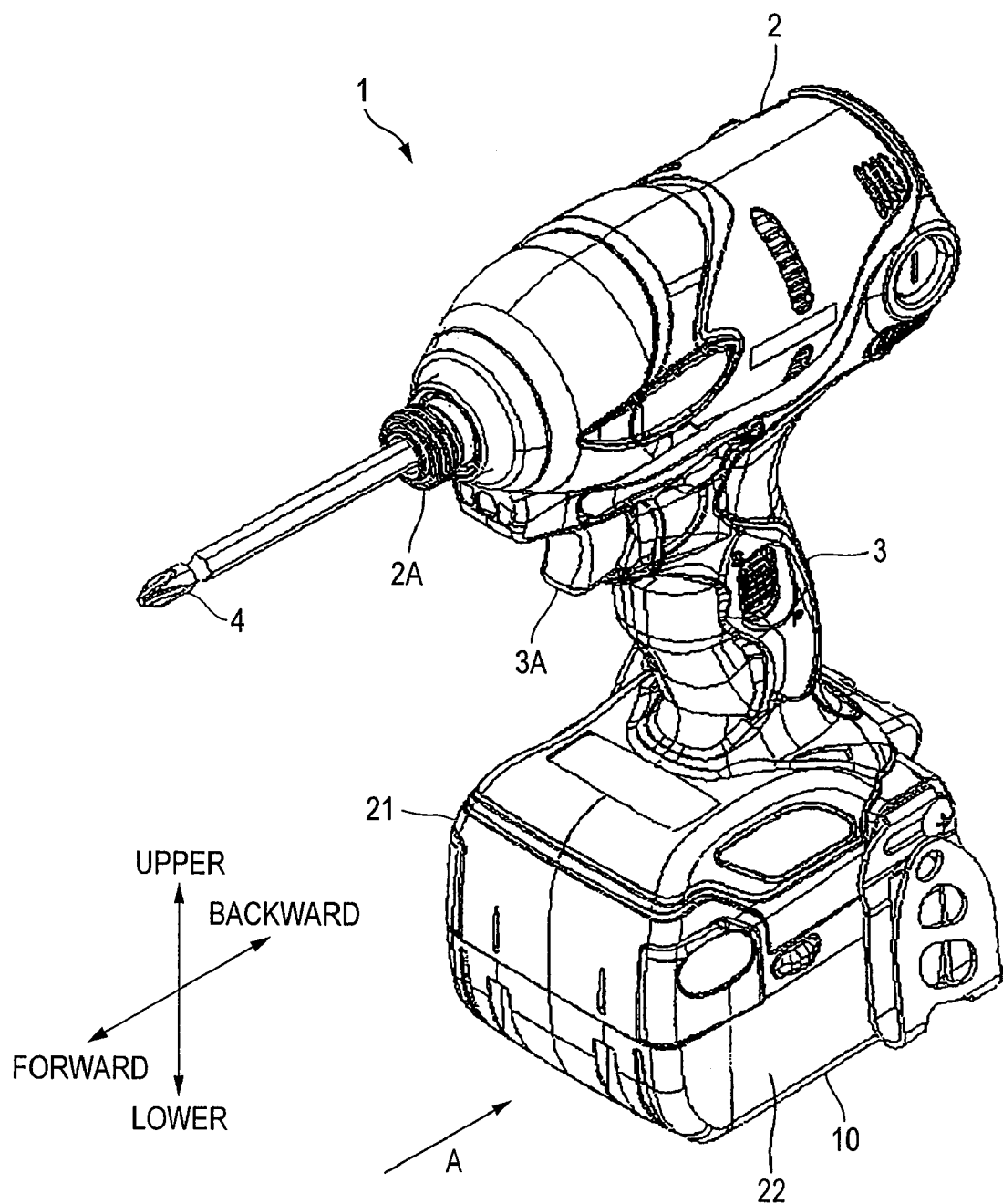
FIG. 1 is a perspective view of a motor-driven tool provided with a battery pack according to the invention.

FIG. 1 shows a motor-driven tool provided with the battery pack according to the invention. A drill 1 as the motor-driven tool includes a body part 2 as a body of the apparatus, and a battery pack 10.

Figure 2:
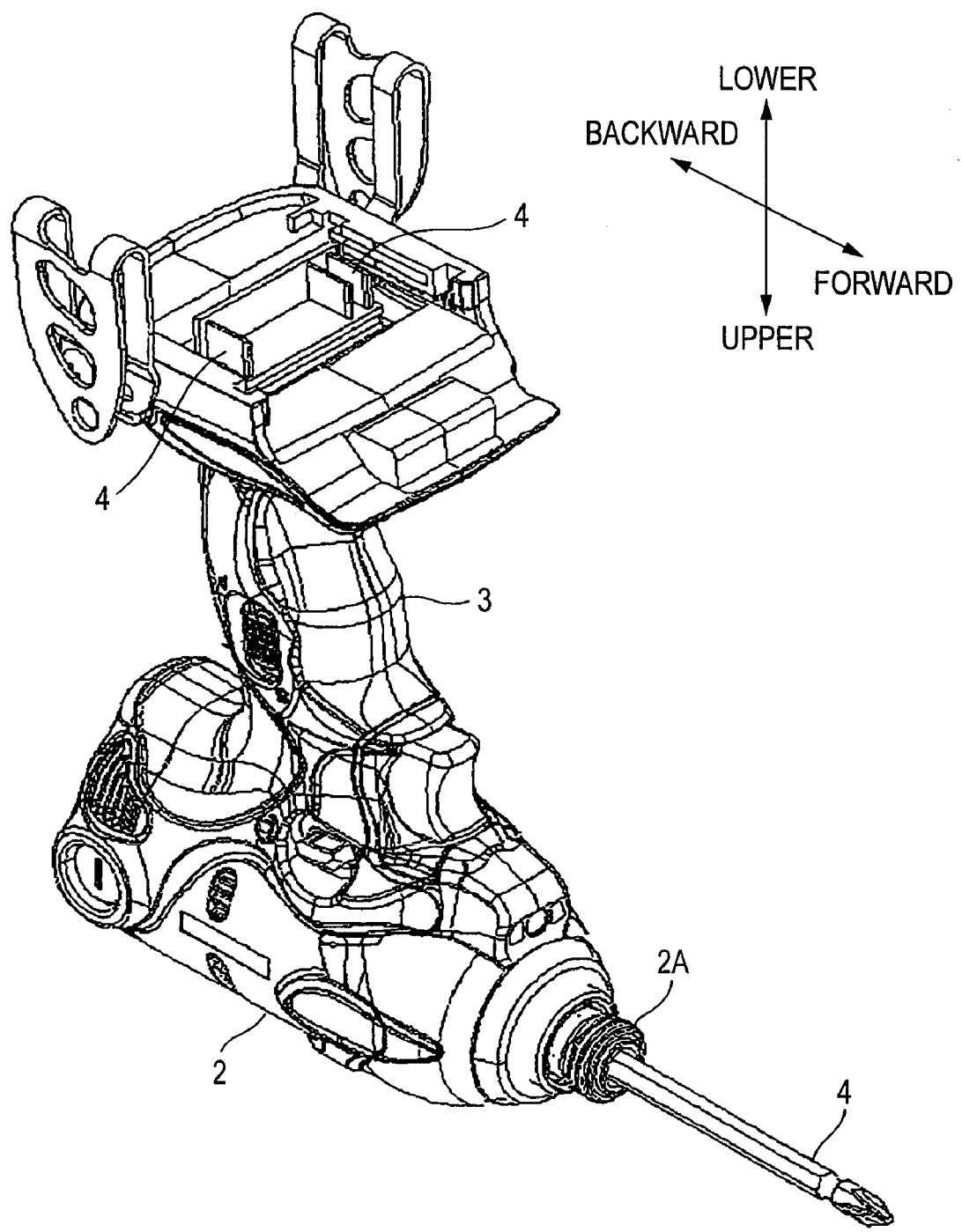
FIG. 2 is a perspective view of the motor-driven tool in FIG. 1 with the battery pack removed, in a state inverted upside down.

A motor (not shown) and a control part (not shown) for controlling motion of the motor are incorporated in the body part 2, and a tool holding part 2A to which a drill bit 4 can be fitted is provided at a distal end portion of the body part 2. A handle 3 is extended downward from a backward end area of the body part 2, and a trigger 3A is provided at a base end of the extended area. The control part will control power supply from the battery pack 10 to the body part 2 through the trigger 3A. Moreover, as shown in FIG. 2, a plurality of terminals 4 in a plate-like shape are provided at an end of the handle 3 in the extended direction thereof so as to protrude toward the front. Two of the plurality of the terminals 4 are power terminals through which electric current for driving the motor flows, and the other terminals are signal transmitting terminals which transmit signals indicating temperature of the battery pack 10 to the control part. Also, the other terminals may serve as terminals for transmitting toward the control part a signal of stopping discharge that interrupts a power supply from the motor-driven tool 1 to the battery pack 10.

The battery pack 10 is mounted to a distal end portion of the handle 3 in the extended direction so as to be attached or detached along the longitudinal direction of the body part 2. As shown in FIG. 1, by inserting the battery pack 10 into the body part 2 in a direction as shown by an arrow mark A along the longitudinal direction of the body part 2, the battery pack 10 will be attached to the body part 2. On the other hand, by moving the battery pack 10 in a direction opposite to the direction of the arrow mark A, the battery pack 10 will be able to be detached from the body part 2.

Figure 3:
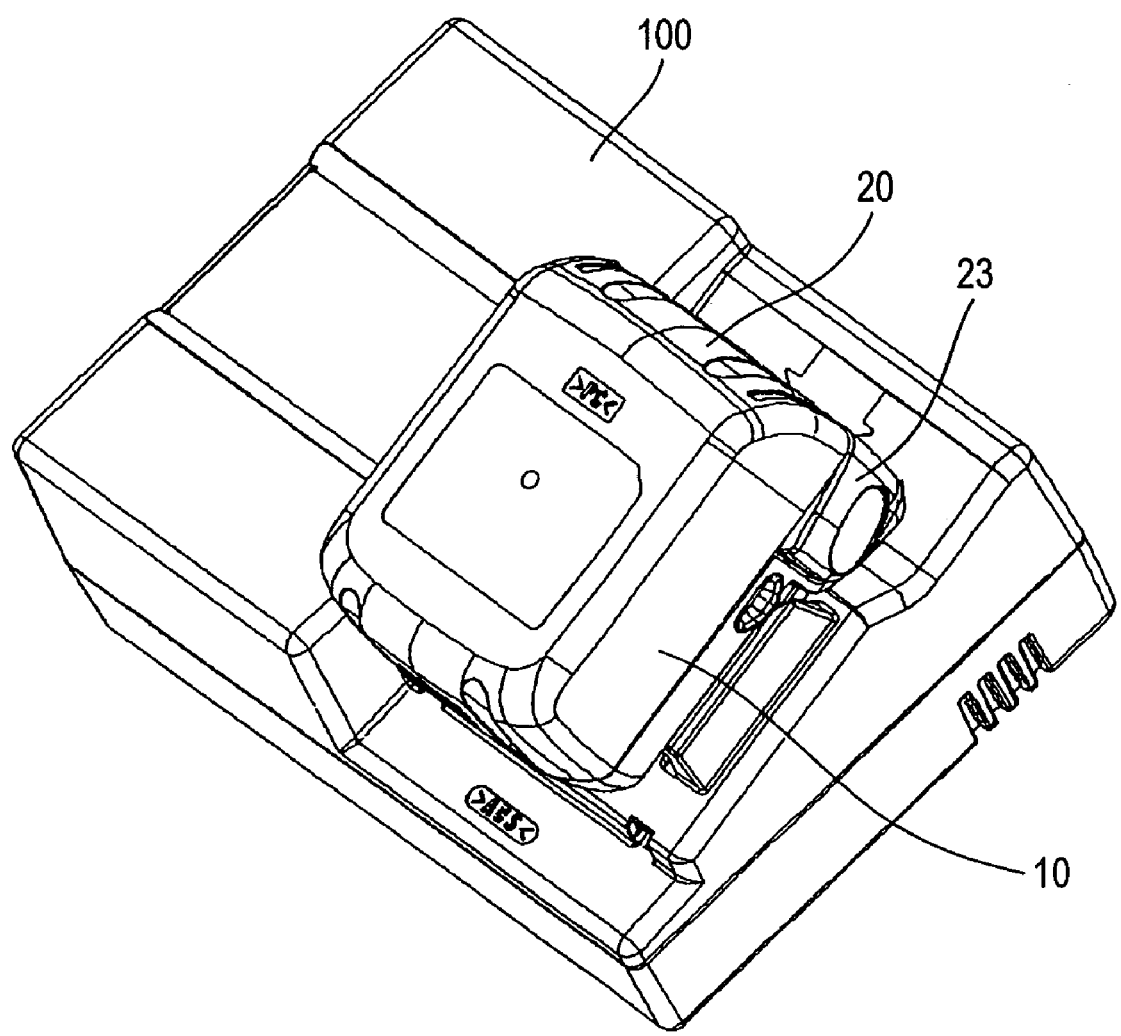
FIG. 3 is a perspective view of the battery pack according to the invention in a state mounted on a charger.

On the other hand, when the battery pack 10 is mounted on a charger 100 in place of the drill 1, as shown in FIG. 3, battery cells (not shown) contained in the battery pack will be charged by the charger 100.

Figure 4:
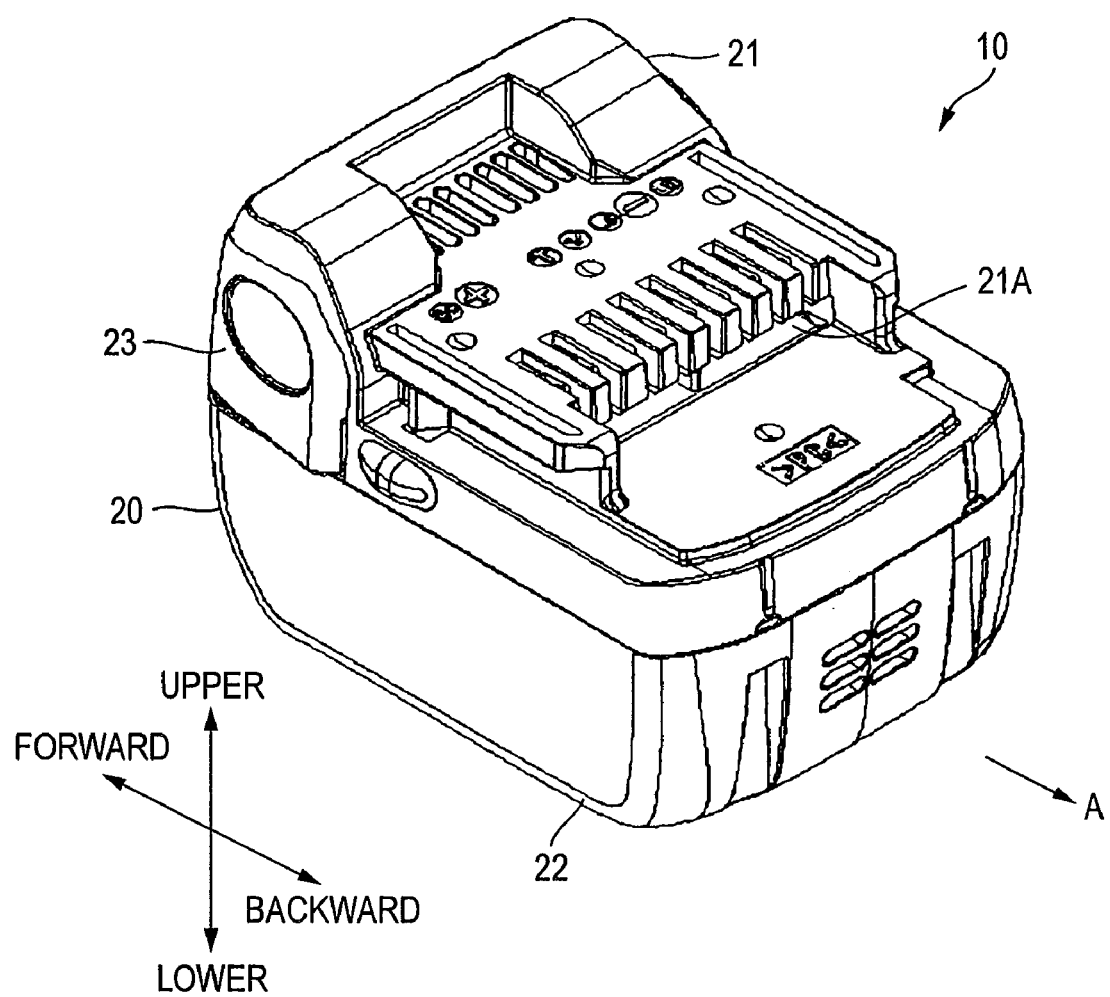
FIG. 4 is a perspective view of the battery pack as shown in FIG. 1.
Figure 5:
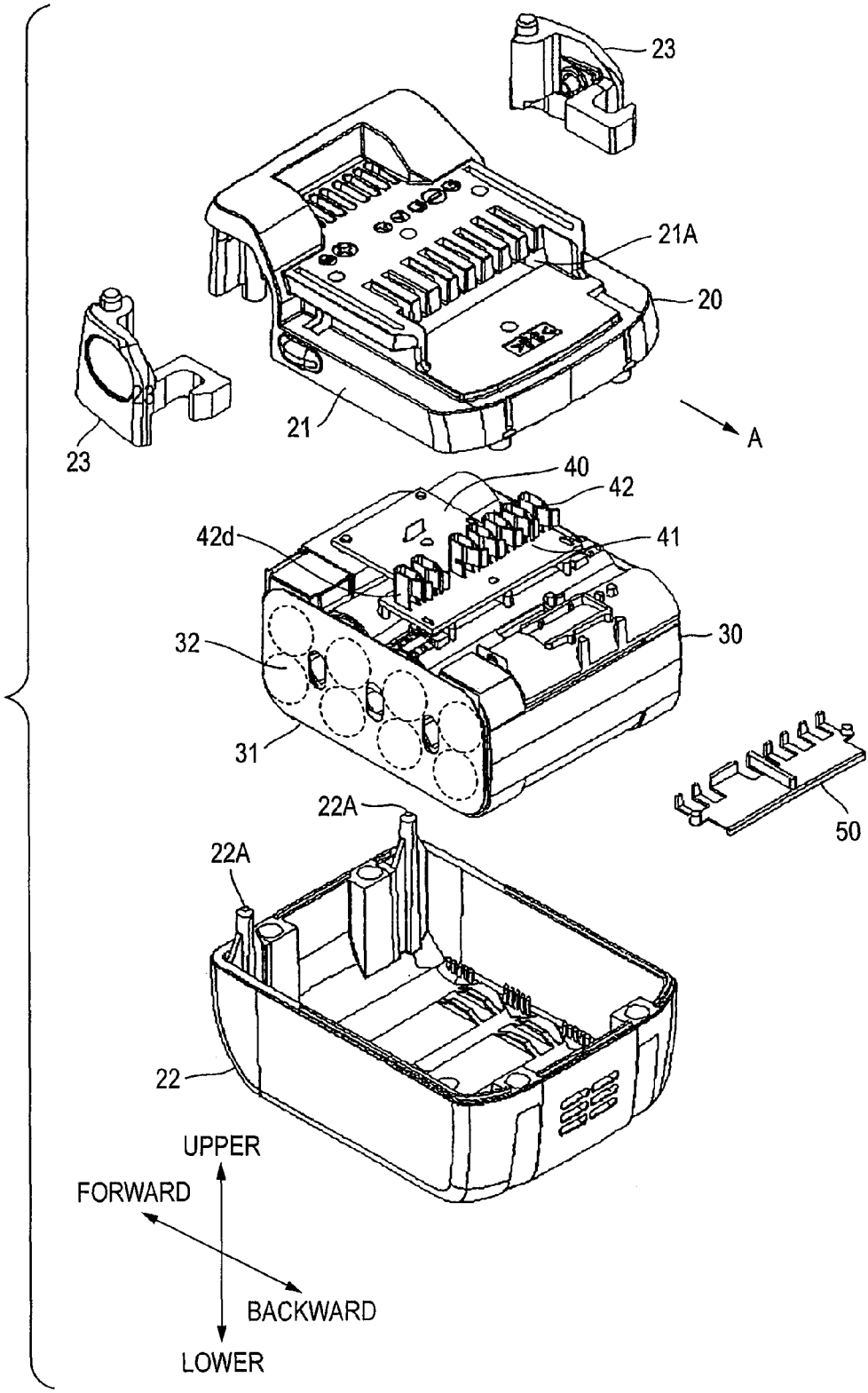
FIG. 5 is an exploded perspective view of the battery pack as shown in FIG. 4.

The battery pack 100 has a group of battery cells 30, a board 40, and a cover 50 in a housing 20 as shown in FIG. 4 so that the battery cells contained therein can be charged and discharged. In FIGS. 4 and 5, the direction as shown by the arrow mark A is an inserting direction of the housing 20 to be inserted into the body part 2. Therefore, by pushing the housing 20 into the body part 2 along the direction of the arrow mark A, the housing 20 will be able to be attached to the body part 2.

The housing 20 includes an upper housing 21 and a lower housing 22, as shown in FIG. 5. The upper and lower housings 21, 22 are engaged with each other by means of bosses 22A. The housing 20 contains therein the group of battery cells 30, the board 40, and the cover 50 in this order from the lower housing 22 to the upper housing 21. The upper housing 21 is formed with a terminal inserting part 21A into which the terminals 4 of the body part 2 are adapted to be inserted. Moreover, a pair of operating pieces 23, 23 for locking the housing 20 to the body part 2 are fitted to both sides of the housing 20 at a front end thereof. The terminal inserting part 21A is covered with the cover 50 so that the board 40 may not be exposed to the exterior.

The group of battery cells 30 includes a plurality of electrically connected battery cells 32 which are contained in a cell frame 31 as a battery cell containing part, and has two electrodes (not shown) which are electrically connected to the battery cells 32. Each of the battery cells 32 is a nickel metal hydride battery or a lithium-ion battery which can be charged and discharged at a plurality of times.

Figure 6:
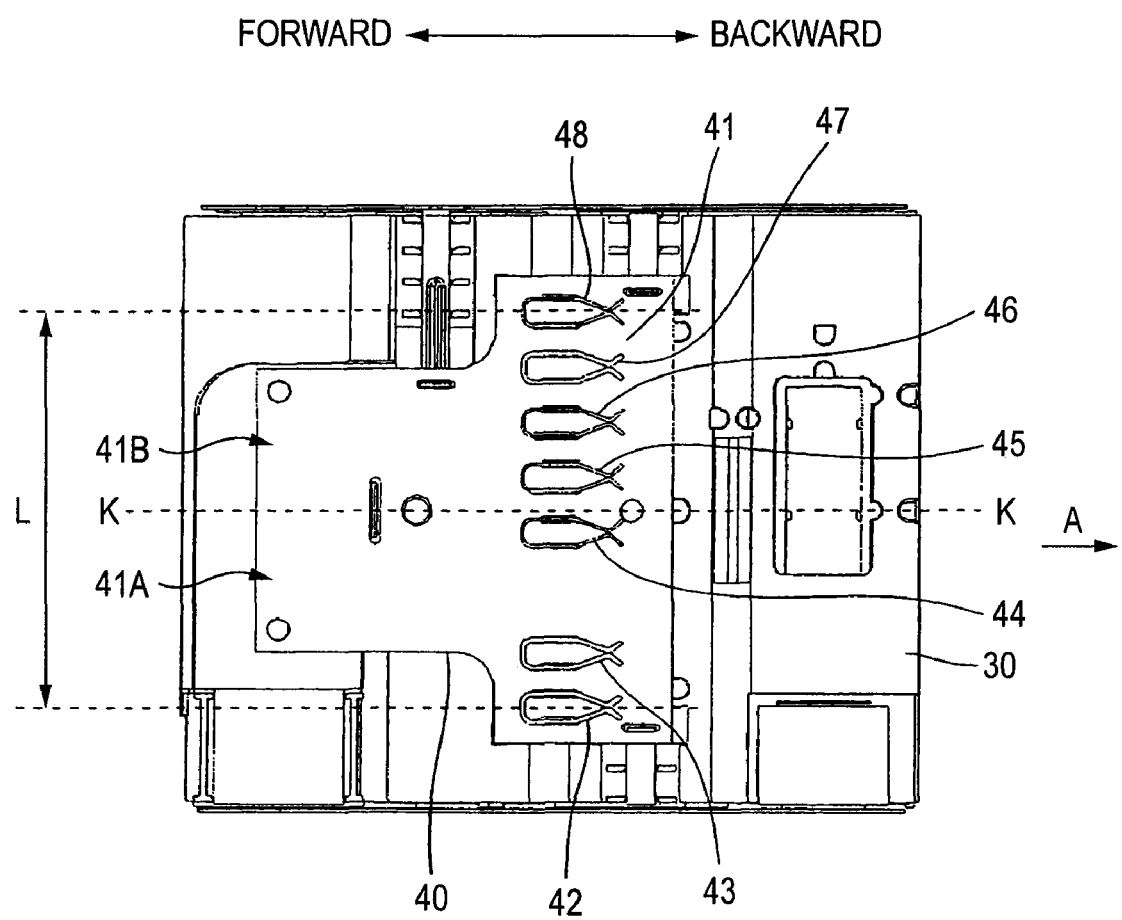
FIG. 6 is a plan view of the battery pack with an upper housing removed.

The board 40 is provided above the group of battery cells 30 so as to be positioned inside the upper housing 21. A terminal arranging part 41 is provided on an upper face of the board 40 along a length L which extends in a direction perpendicular to the inserting direction A. A plurality of terminals 42 to 48 which are adapted to be engaged with the terminals 4 of the body part 2 are arranged on the terminal arranging part 41. In this embodiment, seven terminals 42 to 48 are arranged on the terminal arranging part 41 at appropriate intervals, as shown in FIGS. 5 and 6, and according to necessity, will be engaged with the terminals 4 of the body part 2 which have been inserted through the terminal inserting part 21A.

The seven terminals 42 to 48 includes a charging terminal with positive polarity 42, a discharging terminal with positive polarity 43, signal transmitting terminals 44, 45, 46, a charging and discharging terminal with negative polarity 47, and a signal transmitting terminal 48, in this order from one end of the terminal arranging part 41. The terminals with positive polarity 42, 43 are connected to one of the electrodes of the group of battery cells 30, while the terminal with negative polarity 47 is connected to the other electrode of the group of battery cells 30. Therefore, when the battery cells 32 are charged, electric current corresponding to the charging voltage will flow to the terminal with positive polarity 42 and the terminal with negative polarity 47, and when the battery cells 32 are discharged, electric current corresponding to load of the body part 2 will flow to the terminal with positive polarity 43 and the terminal with negative polarity 47. In other words, the terminals with positive polarity 42, 43 and the terminal with negative polarity 47 are used for passing the electric current corresponding to the charge and discharge of the battery cells 32, between the battery pack 10 and the apparatus attached to the battery pack 10.

The signal transmitting terminals 44, 45, 46 and 48 are respectively used as a terminal for discriminating types and number of the battery cells which are contained, as a terminal for detecting overcharge, as a terminal for transmitting output from a thermistor, and as a terminal for preventing overdischarge or over-current. In other words, control signals for controlling the charge or discharge of the battery pack 10 will be transmitted through the signal transmitting terminals 44, 45, 46, 48. The terminals with positive polarity 42, 43 and the terminal with negative polarity 47 correspond to the first terminals described in the claims, and the signal transmitting terminals 44, 45, 46, 48 correspond to the second terminals.

The terminals with positive polarity 42, 43 are arranged in one of regions 41A of the terminal arranging part 41 which is divided by a phantom centerline K-K passing a middle of the length L of the terminal arranging part 41 and extending in parallel with the inserting direction A. On the other hand, the terminal with negative polarity 47 is arranged in the other region 41B of the terminal arranging part 41 which is divided by the centerline K-K. In other words, the centerline K-K is interposed between the terminal with negative polarity 47 and either one of the terminals with positive polarity 42, 43. The signal transmitting terminals 44, 45, 46, 48 are arranged in the terminal arranging part 41 at appropriate distances from the terminals with positive polarity 42, 43 and the terminal with negative polarity 47.

Figure 7:
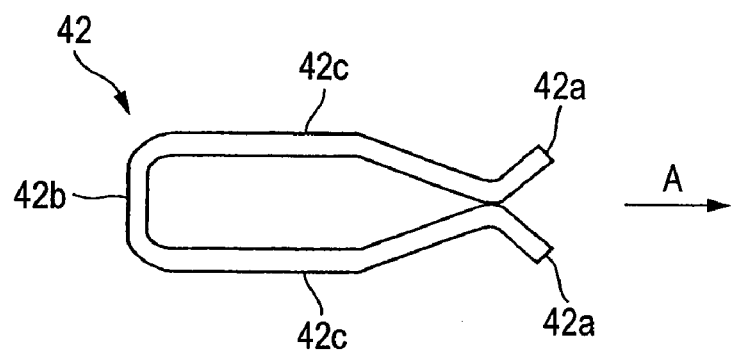
FIG. 7 is a plan view showing one of terminals in the battery pack.

Then, structure of the terminals 42 to 48 will be described referring to FIG. 7. As shown in FIG. 7, each of the terminals 42 to 48 has such a shape that a flat plate of electrically conductive metal is bent into U-shape and portions near an open end of the U-shape are so formed as to be pressure contacted with each other. Therefore, the terminal 42 as an example will be described in detail referring to FIG. 7. The terminal 42 includes two open end portions 42a which are pressure contacted with each other, a bottom portion 42b at which the flat plate is bent into the U-shape, and arm portions 42c which connect the open end portions 42a to the bottom portion 42b. The terminal 42 is fixed to the board 40 by means of a leg portion 42d (See FIG. 5) which extends from the bottom portion 42b toward the board 40, and electrically connected to a corresponding part of the group of battery cells 30. It is to be noted that in the following description, the open end portions, bottom portions, arm portions of the terminals 42 to 48 will be respectively referred to by affixing a, b, c to the reference numerals of the terminals.

Along with the insertion of the battery pack 10 into the body part 2 in the inserting direction A, the terminal 4 of the body part 2 will be pressure fitted into between the open end portions 42a of the terminal 42, and thus, the terminal 42 will be electrically connected to the terminal 4 by the pressure contact between them.

Figure 8A:
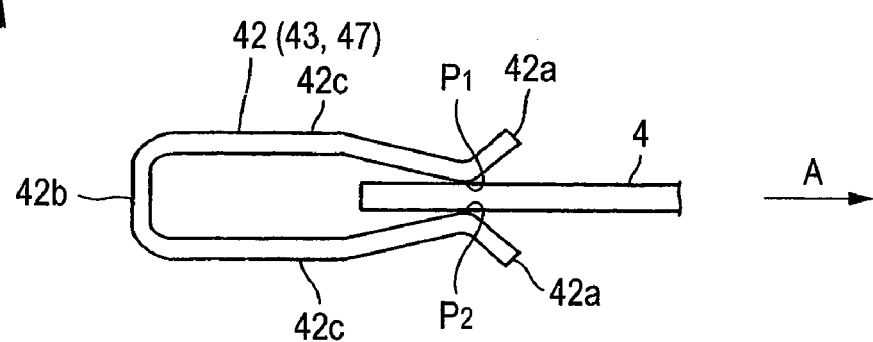
FIG. 8A is a plan view showing terminals with positive polarity and a terminal with negative polarity.
Figure 8B:
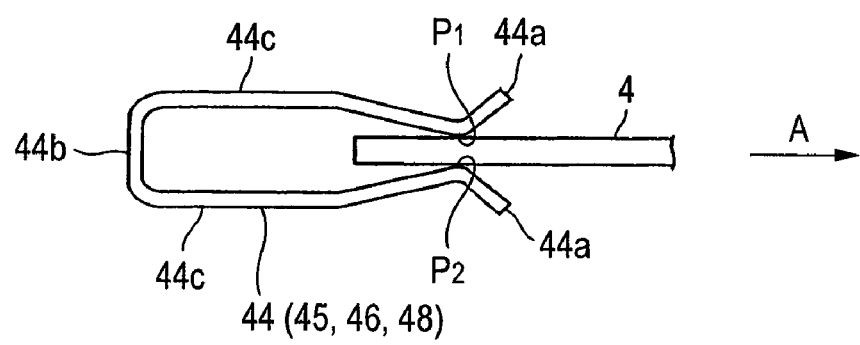
FIG. 8B is a plan view showing signal transmitting terminals.

In this embodiment, the terminals with positive polarity 42, 43 and the terminal with negative polarity 47 are formed of a flat plate having a thickness of 0.5 mm, as shown in FIG. 8(a). On the other hand, the signal transmitting terminals 44, 45, 46, 48 are formed of a flat plate having a thickness of 0.3 mm, as shown in FIG. 8(b). In short, the terminals with positive polarity 42, 43 and the terminal with negative polarity 47 through which the current flows are formed thicker than the signal transmitting terminals 44, 45, 46, 48. As the results, the terminals with positive polarity 42, 43 and the terminal with negative polarity 47 have higher mechanical strength as compared with the signal transmitting terminals 44, 45, 46, 48, and higher fitting pressure, when they are engaged with the terminals 4.

When the battery pack 10 having the above described structure is attached to the drill 1, the battery pack 10 will be inserted into the distal end part of the handle 3 in the extended direction thereof, along the inserting direction A, as shown in FIG. 1. Simultaneously, the terminals 4 will be respectively engaged with the terminal with positive polarity 43, the terminal with negative polarity 47, and the signal transmitting terminal 48. On this occasion, the terminals 4 will be pressure fitted into the terminals 43, 47, 48 so as to spread the open end portions 43a, 47a, 48a, whereby the terminal 4 will be engaged with the terminals 43, 47, 48. Because the terminal with positive polarity 43 and the terminal with negative polarity 47 are thicker as compared with the signal transmitting terminal 48, fitting pressure exerted on a fitting point P1 between each of the terminals 43, 47 and the terminal 4 is higher than the fitting pressure exerted on a fitting point P2 between the terminal 48 and the terminal 4.

Consequently, when the battery pack 10 is attached to the drill 1 to supply power, even in case where a force is continuously exerted on the fitting point P1 with vibration of the drill 1, defective contact between the terminal 4 and the terminal with positive polarity 43 and the terminal with negative polarity 47 will be restrained, whereby generation of heat in the terminals 43, 47 by the current flowing through the terminals 43, 47 can be restrained.

Specifically, because the terminals 43, 47 through which the current from the battery pack 10 flows have wider contact area with respect to the terminals 4 due to the high fitting pressure, increase of contact resistance can be restrained, and generation of heat in the terminals due to the increase of the contact pressure can be restrained. In addition, because the generation of heat is restrained, occurrence of arc between the terminal 43 and the terminal 4, or between the terminal 47 and the terminal 4 will be restrained, whereby damage and blowout of the terminals 43, 47 can be prevented. On the other hand, almost no current flows between the signal transmitting terminal 48 and the terminal 4, and therefore, generation of heat in the terminal 48 can be restrained, even though the contact area with respect to the terminal 4 is small because of the low fitting pressure and the contact resistance is large.

Further, because the fitting pressure of only the terminals 43, 47 through which the current flows is high, the battery pack 10 can be smoothly attached to the drill 1 without requiring any force.

Further, because the terminals 43, 47 which require higher fitting force are separated from each other and arranged relatively close to both sides of the terminal arranging part 41, the force required for attaching the battery pack 10 to the drill 1 can be dispersed and substantially uniformly exerted over the length L of the terminal arranging part 41. Consequently, the battery pack 10 can be smoothly attached to the drill 1.

When the battery pack 10 is mounted on the charger 100 for the purpose of charging the battery pack 10, the terminal with positive polarity 42 and the terminal with negative polarity 47 will be respectively fitted to the power terminals of the charger 100, and the signal transmitting terminals 44, 45, 46 will be respectively fitted to the signal transmitting terminals of the charger 100. In the same manner as in the case where the battery pack is attached to the drill 1, the fitting pressure of the terminals 42, 47 through which the current flows becomes higher than the fitting pressure of the signal transmitting terminals 44, 45, 46. As the results, defective contact of the terminals 42, 47 through which the current flows can be restrained, and generation of heat in the terminals 42, 47 can be restrained. Moreover, the battery pack 10 can be smoothly attached to the charger 100 with a reduced force.

Moreover, in the structure as shown in FIG. 8, substantially the same effect can be obtained, in case where only the arm portions 42c, 43c, 47c of the terminals through which the current flows are formed thicker than the arm portions 44c, 45c, 46c, 48c of the signal transmitting terminals, while the U-shaped bottom portions of all the terminals 42 to 48 have the same thickness.

Figure 9A:
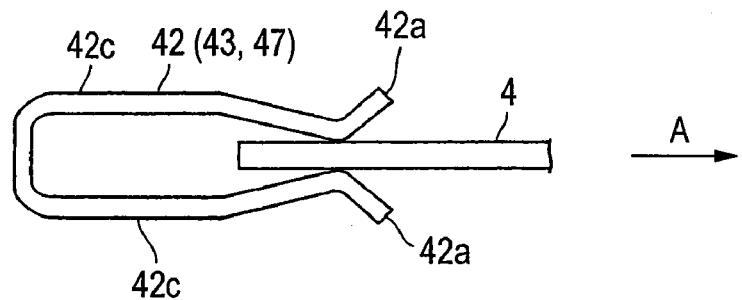
FIG. 9A is a plan view showing another structure of the terminals with positive polarity and the terminal with negative polarity.
Figure 9B:
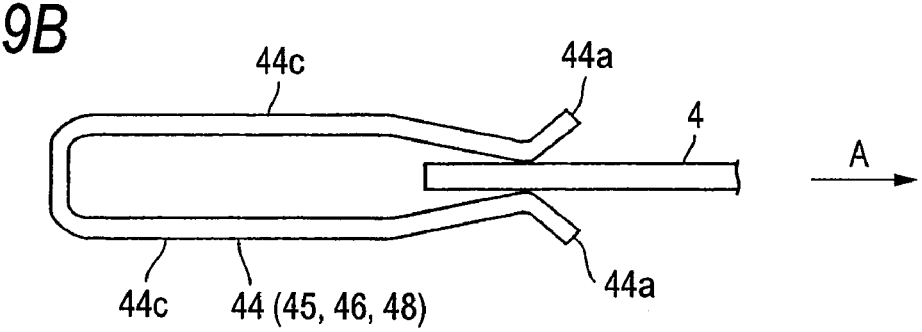
FIG. 9B is a plan view showing another structure of the signal transmitting terminals.

FIG. 9 shows another structure of the terminals 42 to 48. In FIG. 9, the terminals 42 to 48 are formed of flat plates having the same thickness. However, the arm portions 42c, 43c, 47c of the terminals with positive polarity 42, 43 and the terminal with negative polarity 47 as shown in FIG. 9(a) are formed shorter than the arm portions 44c, 45c, 46c, 48c of the signal transmitting terminals 44, 45, 46, 48 as shown in FIG. 9(b). In this manner, the terminals 42, 43, 47 through which the current flows are so formed that they have higher mechanical strength than the signal transmitting terminals 44, 45, 46, 48, and higher fitting pressure when they are engaged with the terminals 4. As the results, substantially the same effect as the terminals 42 to 48 which have the structure as shown in FIG. 8 will be obtained.

Figure 10A:
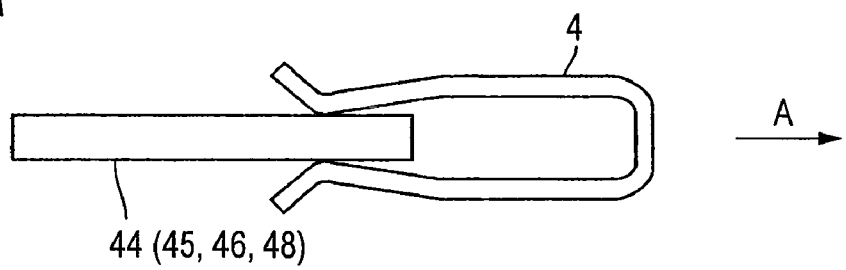
FIG. 10A is a plan view showing another structure of the terminals with positive polarity and the terminal with negative polarity.
Figure 10B:
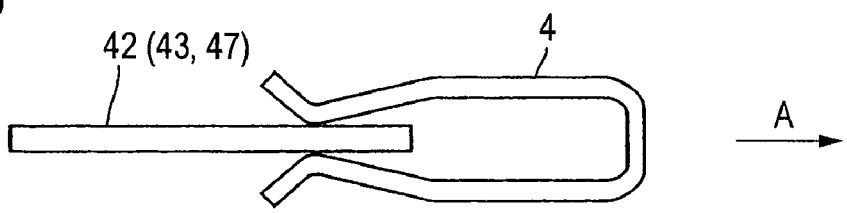
FIG. 10B is a plan view showing another structure of the signal transmitting terminals.

FIG. 10 shows still another structure of the terminals 42 to 48. The terminals 42 to 48 are formed of flat plates of electrically conductive metal. The terminals 42 to 48 are fixed to the board 40 by means of leg portions (not shown) extending from one end portions 42e, 43e, 44e, 45e, 46e, 47e, 48e in the longitudinal direction toward the board 40, and electrically connected to corresponding parts of the group of battery cells 30 or the like. The terminals with positive polarity 42, 43 and the terminal with negative polarity 47 are formed of flat plates having a thickness of 0.5 mm, as shown in FIG. 10(a). On the other hand, the signal transmitting terminals 44, 45, 46, 48 are formed of flat plates having a thickness of 0.3 mm, as shown in FIG. 10(b). In short, the terminals with positive polarity 42, 43 and the terminal with negative polarity 47 through which the current flows are formed thicker than the signal transmitting terminals 44, 45, 46, 48. In case where the terminals 42 to 48 of the battery pack 10 are formed in a plate-like shape, the corresponding terminals 4 of the drill 1 or the charger 100 to which the battery pack 10 is attached are formed in a U-shape having an open end into which the terminals 42 to 48 are adapted to be inserted. In this structure too, the fitting pressure of the terminals through which the current flows becomes higher than the fitting pressure of the signal transmitting terminals, when the terminals 42 to 48 are pressure fitted to the corresponding terminals 4 of the drill 1 or the charger 100, whereby substantially the same effect as the terminals as shown in FIG. 8 will be obtained.

Although in the above described embodiment, the battery pack 10 in which the number of the terminals is seven has been described, the number of the terminals is not limited to seven.

Moreover, it is apparent that the battery pack according to this invention is not limited to the above described embodiment, but various modifications can be made within a scope not deviated from the scope of the claims.

The battery pack according to the invention can be attached to a potable motor-driven tool such as a drill, an impact driver, and so on.

What is claimed is:

1. A battery pack detachably attached to an apparatus provided with a plurality of terminals, and adapted to supply power to the apparatus, said battery pack comprising:
   a housing;
   a battery cell containing part which is provided in said housing and contains battery cells;
   a plurality of first terminals which are electrically connected to said battery cell containing part; and
   a plurality of second terminals through which control signals for controlling at least one of charge and discharge of the battery cells contained in said battery cell containing part are transmitted;
   wherein said first terminals and said second terminals can be pressure fitted to corresponding terminals of said body of the apparatus, and
   wherein said first terminals and said second terminals are configured such that when said housing has been attached to said body of the apparatus, fitting pressure exerted on said first terminals is higher than fitting pressure exerted on said second terminals.

2. A battery pack as claimed in claim 1, wherein the terminals of the apparatus have such a shape that a flat plate in a substantially rectangular shape formed of electrically conductive material is bent into a U-shape, and is so shaped as to be pressure contacted with each of the first and second terminals of said body of the apparatus, when said terminal of the body of the apparatus is engaged with said first or second terminal by inserting it into an open end of the U-shape along an inserting direction from said open end of the U-shape toward a bottom of the U-shape, and
   wherein the flat plate of said first terminal has a larger thickness than the flat plate of said second terminal.

3. A battery pack as claimed in claim 1, wherein the terminals of the apparatus have such a shape that a flat plate in a substantially rectangular shape formed of electrically conductive material is bent into a U-shape, and is so shaped as to be pressure contacted with each of the terminals of said body of the apparatus, when said terminal of the body is engaged with said first or second terminal by inserting it into an open end of the U-shape along an inserting direction from said open end of the U-shape toward a bottom of the U-shape, and
wherein an arm portion of the U-shape of said first terminal has a shorter length than an arm portion of the U-shape of said second terminal.

4. A battery pack as claimed in claim 1, wherein each of said first and second terminals is formed as a flat plate in a substantially rectangular shape formed of electrically conductive material which extends in a direction of inserting said housing into said apparatus, and
wherein the flat plate of said first terminal has a larger thickness than the flat plate of said second terminal.

5. A battery pack as claimed claim 2, wherein said first and second terminals are provided in said housing in a row along a first length extending in a direction perpendicular to said inserting direction, and that a plurality of said first terminals are separated to be arranged at both sides of a centerline which intersects a middle of said first length.

6. A battery pack as claimed in claim 1, wherein said apparatus is a motor-driven tool.

7. A battery pack as claimed in claim 1, wherein said first and second terminals are so constructed that when said housing is mounted on a charger having a plurality of terminals, said first and second terminals are pressure fitted to corresponding terminals of said charger, and fitting pressure exerted on said first terminals is higher than fitting pressure exerted on said second terminal.

8. An assembly of a battery pack and a motor-driven tool to which power can be supplied from said battery pack, said battery pack comprising:
a housing;
a battery cell containing part which is provided in said housing and contains battery cells;
a plurality of first terminals which are electrically connected to said battery cell containing part;
a plurality of second terminals through which control signals for controlling discharge of the battery cells are transmitted;
wherein said motor-driven tool comprises:
a motor;
a mounting part on which said battery pack can be detachably mounted;
power supply terminals provided on said mounting part in electrical connection with said motor, the power supply terminals respectively engagable with said first terminals, and
signal terminals provided on said mounting part and engageable with said second terminals,
wherein said first and second terminals, said power supply terminals, and said signal terminals are so constructed that fitting pressure at a time when said first terminals are engaged with said power supply terminals is higher than fitting pressure at a time when said second terminals are engaged with said signal terminals.

9. An assembly of a battery pack and a motor-driven tool as claimed in claim 8, wherein each of said first terminals has such a shape that a flat plate in a substantially rectangular shape having a first thickness and formed of electrically conductive material is bent into a U-shape, and is so shaped as to be pressure contacted with each of said power supply terminals, when said power supply terminal is engaged with said first terminal by inserting it into an open end of the U-shape along an inserting direction from said open end of the U-shape toward a bottom of the U-shape,
wherein each of said second terminals has such a shape that a flat plate in a substantially rectangular shape having a second thickness and formed of electrically conductive material is bent into a U-shape, and is so shaped as to be pressure contacted with each of the signal terminals, when said signal terminal is engaged with said second terminal by inserting it into an open end of the U-shape along an inserting direction from said open end of the U-shape toward a bottom of the U-shape,
wherein each of said power supply terminals and said signal terminals is formed as a flat plate in a substantially rectangular shape formed of electrically conductive material and extending in the inserting direction, and
wherein said first thickness is larger than said second thickness.

10. An assembly of a battery pack and a motor-driven tool as claimed in claim 8, wherein each of said first terminals has such a shape that a flat plate in a substantially rectangular shape formed of electrically conductive material is bent into a U-shape, and is so shaped as to be pressure contacted with each of said power supply terminals, when said power supply terminal is engaged with said first terminal by inserting it into an open end of the U-shape along an inserting direction from said open end of the U-shape toward a bottom of the U-shape,
wherein each of said second terminals has such a shape that a flat plate in a substantially rectangular shape formed of electrically conductive material is bent into a U-shape, and is so shaped as to be pressure contacted with each of the signal terminals, when said signal terminal is engaged with said second terminal by inserting it into an open end of the U-shape along an inserting direction from said open end of the U-shape toward a bottom of the U-shape,
wherein each of said power supply terminals and said signal terminals is formed as a flat plate in a substantially rectangular shape formed of electrically conductive material and extending in the inserting direction, and
wherein arm portions of the U-shape of said first terminal has a shorter length than arm portions of the U-shape of said second terminal.

11. An assembly of a battery pack and a motor-driven tool as claimed in claim 8, wherein each of said power supply terminals has such a shape that a flat plate in a substantially rectangular shape formed of electrically conductive material is bent into a U-shape, and is so shaped as to be pressure contacted with each of said first terminals, when said first terminal is engaged with said power supply terminal by inserting it into an open end of the U-shape along an inserting direction from said open end of the U-shape toward a bottom of the U-shape,
wherein each of said signal terminals has such a shape that a flat plate in a substantially rectangular shape formed of electrically conductive material is bent into a U-shape, and is so shaped as to be pressure contacted with each of the second terminals, when said second terminal is engaged with said signal terminal by inserting it into an open end of the U-shape along an inserting direction from said open end of the U-shape toward a bottom of the U-shape,
wherein each of said first terminals is formed as a flat plate in a substantially rectangular shape having a first thickness and formed of electrically conductive material extending in the inserting direction, wherein each of said second terminals is formed as a flat plate in a substantially rectangular shape having a second thickness and formed of electrically conductive material extending in the inserting direction, and wherein said first thickness is larger than said second thickness.

12. An assembly of a battery pack and a motor-driven tool as claimed in claim 9, wherein said first and second terminals are provided in said housing in a row along a first length extending in a direction perpendicular to said inserting direction, and that said first terminals are separated to be arranged at both sides of a centerline which intersects a middle of said first length.

13. An assembly of a battery pack and a charger which can charge said battery pack, said battery pack comprising:
  a housing;
  a battery cell containing part which is provided in said housing and contains battery cells;
  a plurality of first terminals which are electrically connected to said battery cell containing part;
  a plurality of second terminals through which control signals for controlling charge of the battery cells are transmitted,
  wherein said charger comprises:
  a mounting part on which said battery pack can be detachably mounted;
  power supply terminals provided in said mounting part so as to be connected to a power source, and adapted to be respectively engaged with said first terminals; and
  signal terminals provided in said mounting part and adapted to be engaged with said second terminals,
  wherein said first and second terminals, said power supply terminals, and said signal terminals are so constructed that fitting pressure at a time when said first terminals are engaged with said power supply terminals is higher than fitting pressure at a time when said second terminals are engaged with said signal terminals.

14. An assembly of a battery pack and a charger as claimed in claim 13, wherein each of said first terminals has such a shape that a flat plate in a substantially rectangular shape having a first thickness and formed of electrically conductive material is bent into a U-shape, and is so shaped as to be pressure contacted with each of said power supply terminals, when said power supply terminal is engaged with said first terminal by inserting it into an open end of the U-shape along an inserting direction from said open end of the U-shape toward a bottom of the U-shape,
  wherein each of said second terminals has such a shape that a flat plate in a substantially rectangular shape having a second thickness and formed of electrically conductive material is bent into a U-shape, and is so shaped as to be pressure contacted with each of the signal terminals, when said signal terminal is engaged with said second terminal by inserting it into an open end of the U-shape along an inserting direction from said open end of the U-shape toward a bottom of the U-shape,
  wherein each of said power supply terminals and said signal terminals is formed as a flat plate in a substantially rectangular shape formed of electrically conductive material and extending in the inserting direction, and
  wherein said first thickness is larger than said second thickness.

15. An assembly of a battery pack and a charger as claimed in claim 13, wherein each of said first terminals has such a shape that a flat plate in a substantially rectangular shape formed of electrically conductive material is bent into a U-shape, and is so shaped as to be pressure contacted with each of said power supply terminals, when said power supply terminal is engaged with said first terminal by inserting it into an open end of the U-shape along an inserting direction from said open end of the U-shape toward a bottom of the U-shape,
  wherein each of said second terminals has such a shape that a flat plate in a substantially rectangular shape formed of electrically conductive material is bent into a U-shape, and is so shaped as to be pressure contacted with each of the signal terminals, when said signal terminal is engaged with said second terminal by inserting it into an open end of the U-shape along an inserting direction from said open end of the U-shape toward a bottom of the U-shape,
  wherein each of said power supply terminals and said signal terminals is formed as a flat plate in a substantially rectangular shape formed of electrically conductive material and extending in the inserting direction, and
  wherein arm portions of the U-shape of said first terminal has a shorter length than arm portions of the U-shape of said second terminal.

16. An assembly of a battery pack and a charger as claimed in claim 13, wherein each of said power supply terminals has such a shape that a flat plate in a substantially rectangular shape formed of electrically conductive material is bent into a U-shape, and is so shaped as to be pressure contacted with each of said first terminals, when said first terminal is engaged with said power supply terminal by inserting it into an open end of the U-shape along an inserting direction from said open end of the U-shape toward a bottom of the U-shape,
  wherein each of said signal terminals has such a shape that a flat plate in a substantially rectangular shape formed of electrically conductive material is bent into a U-shape, and is so shaped as to be pressure contacted with each of the second terminals, when said second terminal is engaged with said signal terminal by inserting it into an open end of the U-shape along an inserting direction from said open end of the U-shape toward a bottom of the U-shape,
  wherein each of said first terminals is formed as a flat plate in a substantially rectangular shape having a first thickness and formed of electrically conductive material extending in the inserting direction,
  wherein each of said second terminals is formed as a flat plate in a substantially rectangular shape having a second thickness and formed of electrically conductive material extending in the inserting direction, and
  wherein said first thickness is larger than said second thickness.

17. An assembly of a battery pack and a charger as claimed in claim 14, wherein said first and second terminals are provided in said housing in a row along a first length extending in a direction perpendicular to said inserting direction, and that said first terminals are separated to be arranged at both sides of a centerline which intersects a middle of said first length.

* * * * *